US009890287B2

(12) United States Patent
Kniess et al.

(10) Patent No.: US 9,890,287 B2
(45) Date of Patent: Feb. 13, 2018

(54) PIGMENTS

(71) Applicant: Merck Patent GmbH, Darmstadt (DE)

(72) Inventors: Helge Bettina Kniess, Rossdorf (DE); Franciscus Gerardus Henricus Van Duijnhoven, NX Mierlo (NL); Franciscus Wilhelmus Maria Gelissen, Selfkant (DE)

(73) Assignee: Merck Patent GmbH, Darmstadt (DE)

( * ) Notice: Subject to any disclaimer, the term of this patent is extended or adjusted under 35 U.S.C. 154(b) by 18 days.

(21) Appl. No.: 15/111,840

(22) PCT Filed: Dec. 17, 2014

(86) PCT No.: PCT/EP2014/003397
§ 371 (c)(1),
(2) Date: Jul. 15, 2016

(87) PCT Pub. No.: WO2015/106788
PCT Pub. Date: Jul. 23, 2015

(65) Prior Publication Data
US 2016/0333184 A1 Nov. 17, 2016

(30) Foreign Application Priority Data
Jan. 16, 2014 (DE) .................. 10 2014 000 359

(51) Int. Cl.
*C09C 1/00* (2006.01)
*C09D 11/037* (2014.01)
*C09D 11/322* (2014.01)
*C08K 3/22* (2006.01)
*C01G 29/00* (2006.01)
*B41M 5/26* (2006.01)
*B41J 2/44* (2006.01)
*C08K 3/20* (2006.01)

(52) U.S. Cl.
CPC ............ *C09C 1/0084* (2013.01); *B41J 2/442* (2013.01); *B41M 5/267* (2013.01); *C01G 29/006* (2013.01); *C08K 3/20* (2013.01); *C09C 1/00* (2013.01); *B41M 2205/04* (2013.01); *C01P 2004/61* (2013.01); *C01P 2004/62* (2013.01); *C01P 2004/80* (2013.01); *C01P 2004/82* (2013.01); *C08K 2003/2241* (2013.01)

(58) Field of Classification Search
CPC ...... C09D 11/037; C09D 11/322; C08K 3/22; C08K 3/0033; C08K 2003/2241; C09C 1/0084; C01G 29/00; C01G 29/006; C01P 2004/61; C01P 2004/62; C01P 2004/80; C01P 2004/82
USPC ................................. 106/31.9, 479
See application file for complete search history.

(56) References Cited

U.S. PATENT DOCUMENTS

| | | | | |
|---|---|---|---|---|
| 3,553,001 A * | 1/1971 | Kohlschutter et al. | .. | C09D 1/00 427/218 |
| 3,980,491 A * | 9/1976 | Eberts | .................. | C09C 1/0015 106/418 |
| 4,617,061 A * | 10/1986 | Kohler | .................. | C01B 13/18 106/453 |
| 5,149,369 A * | 9/1992 | Eberts | .................... | C01G 29/00 106/479 |
| 5,336,312 A * | 8/1994 | Byrne | .................. | C01G 29/006 106/479 |
| 6,171,383 B1 * | 1/2001 | Sakoske | .................... | C09C 1/00 106/479 |
| 6,464,772 B1 * | 10/2002 | Vermoortele | ........ | C01G 29/006 106/479 |
| 6,503,316 B1 | 1/2003 | Sakoske et al. | | |
| 6,582,507 B1 * | 6/2003 | Cao | ........................ | C09C 1/0015 106/31.9 |
| 6,680,121 B2 | 1/2004 | Sakoske et al. | | |
| 7,318,862 B2 | 1/2008 | Carsten et al. | | |
| 8,778,494 B2 | 7/2014 | Edler et al. | | |
| 8,790,769 B2 * | 7/2014 | Prissok | .................. | B41M 5/267 428/156 |
| 9,637,651 B2 * | 5/2017 | Matoda | ................ | C09D 11/037 |
| 2003/0108723 A1 | 6/2003 | Sakoske et al. | | |
| 2005/0252417 A1 | 11/2005 | Carsten et al. | | |
| 2006/0155007 A1 * | 7/2006 | Huber | .................. | C09D 11/037 523/205 |
| 2008/0092778 A1 * | 4/2008 | Bauer | .................. | C09D 11/037 106/419 |
| 2012/0010345 A1 | 1/2012 | Edler et al. | | |
| 2016/0251492 A1 * | 9/2016 | Kniess | ..................... | C08K 3/22 524/408 |

FOREIGN PATENT DOCUMENTS

| CN | 1224035 A | 7/1999 |
|---|---|---|
| CN | 1696213 A | 11/2005 |
| CN | 101786660 A | 7/2010 |
| CN | 102356131 A | 2/2012 |
| CN | 102794186 A | 11/2012 |

(Continued)

OTHER PUBLICATIONS

Chinese Office Action dated Mar. 29, 2017 issued in corresponding CN 201480073128.9 application (5 pages).
English Abstract of CN 1224035 A published Jul. 28, 1999.
English Abstract of CN 101786660 A published Jul. 28, 2010.
English Abstract of CN 102794186 A published Nov. 28, 2012.
English Abstract of CN 103172116 A published Jun. 26, 2013.
English Abstract of CN 103395837 A published Nov. 20, 2013.
English Abstract of CN 103464182 A published Dec. 25, 2013.
International Search Report dated Apr. 8, 2015 issued in corresponding PCT/EP2014/003397 application (3 pages).

(Continued)

*Primary Examiner* — Helene Klemanski
(74) *Attorney, Agent, or Firm* — Millen White Zelano and Branigan, PC

(57) ABSTRACT

The present invention relates to pigments based on bismuth compounds and to the use thereof, preferably as laser-absorbent additive, and to a process for the preparation thereof.

13 Claims, No Drawings

(56) References Cited

FOREIGN PATENT DOCUMENTS

| CN | 103172116 A | 6/2013 |
|----|-------------|--------|
| CN | 103395837 A | 11/2013 |
| CN | 103464182 A | 12/2013 |
| EP | 1190988 A2 | 3/2002 |

OTHER PUBLICATIONS

J.F. Ackerman, "The Structures of Bi3PbWO8Cl and Bi4NbO8Cl and the Evolution of the Bipox Structure Series", Journal of Solid State Chemistry, vol. 62 (1986) pp. 92-104.

M. Zhang et al., "BiOCl Nanosheet/Bi4Ti3O12 Nanofiber Heterostructures with Enhanced Photocatalytic Activity", Catalysis Communications, vol. 58 (2015) pp. 122-126.

\* cited by examiner

PIGMENTS

The present invention relates to pigments based on bismuth compounds and to the use thereof, preferably as laser-absorbent additive, and to a process for the preparation thereof.

The identification marking of products is becoming increasingly important in virtually all branches of industry. For example, it is frequently necessary to apply production dates, expiry dates, bar codes, company logos, serial numbers, etc., to plastic parts or flexible plastic films. These inscriptions are currently usually carried out using conventional techniques, such as printing, hot embossing, other embossing methods or labelling. In particular in the case of plastics, however, increasing importance is being attached to a contactless, very rapid and flexible inscription method using lasers. With this technique, it is possible to apply graphic prints, such as, for example, bar codes, at high speed, even to non-planar surfaces. Since the inscription is located within the plastic article itself, it is durably abrasion-resistant.

It is generally known that, on irradiation with laser light, certain materials, such as polymers, for example, plastics and resins, can absorb energy from the laser light and convert this energy into heat, where a colour-changing reaction (=inscription) can be induced in the material. Laser-light absorbers are used to improve the absorption of laser light if the intrinsic ability of a polymer with respect to the absorption of laser light is inadequate.

Many plastics, for example polyolefins and polystyrenes, have hitherto been difficult or even impossible to inscribe using a laser. A $CO_2$ laser which emits infrared light in the region of 10.6 μm only gives rise to a very weak, virtually illegible inscription on polyolefins or polystyrenes, even on use of high power. In the case of polyurethane elastomers and polyetherester elastomers, there is no interaction with Nd-YAG lasers, but embossing occurs on use of $CO_2$ lasers.

A plastic must not reflect or transmit any laser light, since then no interaction occurs. Nor must excessively strong absorption take place, however, since in this case the plastic evaporates, leaving only an embossing. The absorption of laser beams, and therefore the interaction with the material, depends on the chemical structure of the composition and on the laser wavelength used. It is frequently necessary to add suitable additives, such as absorbers, in order to render plastics laser-inscribable.

The successful absorber should have a very pale inherent colour and/or only have to be employed in very small amounts. The prior art discloses that the contrast agent antimony trioxide satisfies such criteria. However, antimony trioxide is toxic and suspected of being carcinogenic, and antimony-free laser-inscription additives are therefore desired.

Antimony-free laser inscription additives are known from the literature, as described, for example, in the patent applications WO 2011/083100 A1, WO 2011/050934 A2 and WO 2006/065611 A1. EP 1 190 988 B1 discloses laser-inscribable compounds which contain bismuth and at least one additional metal. US 2007/029294 A1 is directed to the laser inscription of polymers comprising compounds of the formula MOCl, where M is either As, Sb or Bi, and comprising $BiONO_3$, $Bi_2O_2CO_3$, BiOOH, BiOF, BiOBr, $Bi_2O_3$ or $BiOC_3H_5O_7$.

WO 2011/050934 A2 describes, for example, the stabilisation of $Bi_2O_3$ by extrusion of $Bi_2O_3$ and a functionalised polymer, so that the $Bi_2O_3$-containing additive can subsequently be incorporated into polymers ("matrix") having a melting point higher than 220° C., for example into polyester, polyamide or polycarbonate. The disadvantage of this method is that the bismuth additive prepared cannot be used universally for any polymer matrix, i.e. there is non-miscibility of various polymers, for example with polyethylene and polyamide.

The disadvantage of bismuth-based laser inscription additives is that they are not suitable for all types of plastics. In certain matrix polymers, the bismuth compounds exhibit strong discoloration if high processing temperatures, i.e. >220° C., are employed. In these cases, $Bi_2O_3$ cannot be used as colour former for the laser inscription of matrix polymers, for example of polyamide, since an exothermic reaction (decomposition) takes place during processing, resulting in extreme discoloration of the product. The product becomes dark and a mark is no longer visible.

The object of the present invention is therefore to provide a pigment based on one or more bismuth compounds in a form which can be incorporated universally as additive, preferably as laser additive, directly into any polymer without decomposition reactions taking place with the polymer matrix. The pigment should preferably be colourless in order to be suitable for universal use as laser additive.

Surprisingly, it has now been found that pigments based on one or more bismuth compounds which are coated with $TiO_2$ and subsequently calcined do not exhibit decomposition reactions on incorporation into plastics and furthermore no difficulties are observed during processing, such as, for example, non-miscibility. This is favoured by the formation of $Bi_aTi_bO_c$ phases during the calcination, such as, for example, $Bi_2Ti_4O_{11}$, $Bi_2Ti_2O_7$ and/or $Bi_{1.74}Ti_2O_{6.62}$ phases.

The invention thus relates to pigments of the formula I

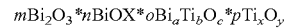    I in which
X denotes halogen
a denotes 1-15,
b denotes 1-5,
c denotes 1-15,
m denotes 0-5,
n denotes 1-5,
o denotes 1-5,
p denotes 0-5,
x denotes 1-8,
y denotes 1-10.

The present invention likewise relates to a process for the preparation of the pigments according to the invention and to the use of the pigments as additive, inter alia in paints, coatings, plastics, printing inks and in cosmetic formulations.

Suitable as base substrate are per se all uncoated bismuth compounds known to the person skilled in the art, such as, for example, $Bi_2O_3$, BiOCl, $Bi(NO_3)_3$, $BiONO_3$, $Bi_2O_2CO_3$, BiOOH, BiOF, BiOBr, $BiOC_3H_5O_7$, $Bi(C_7H_5O_2)_3$, $BiPO_4$, $Bi_2(SO_4)_3$, $Bi_aM_bO_c$ (where M=Zn, Ti, Fe, Cu, Al, Zr, P, Sn, Sr, Si, Y, Nb, La, Ta, Pr, Ca, Mg, Mo, W, Sb, Cr, Ba, Ce and a=0.3-70, b=0.05-8 and c=1-100). Particularly preferred base substrates are $Bi_2O_3$, furthermore BiOCl, BiOOH, BiOF and BiOBr. The substrate is very particularly preferably $Bi_2O_3$.

The size of the base substrate is not crucial per se and can be matched to the particular application. In general, the bismuth compounds are in the form of particles and have a particle size of 0.001-100 μm, preferably 0.005-50 μm and in particular 0.01-10 μm.

All bismuth compounds known to the person skilled in the art can be employed, irrespective of the particle shape. The shape of the substrates is not crucial and can be, for example, spherical, oval, rod-shaped, flake-form or amorphous.

$Bi_2O_3$ is commercially available, for example from 5N Plus Lübeck GmbH, Germany (previously MCP-HEK GmbH), from Poch S. A., Poland or from Merck Millipore GmbH, Germany.

The coating of the base substrates with $TiO_2$ is preferably carried out by wet-chemical methods, where the wet-chemical coating methods developed for the preparation of pearlescent pigments can be used. Furthermore, the $TiO_2$ coating can also be carried out by gas-phase coating in a fluidised-bed reactor, where, for example, the methods proposed in EP 0 045 851 A1 and EP 0 106 235 A1 for the preparation of pearlescent pigments can be used correspondingly.

For the application of titanium dioixide, the method described in U.S. Pat. No. 3,553,001 is preferably employed. In this, an aqueous solution of an inorganic titanium salt is preferably slowly added to a suspension of the substrates heated to about 50-100° C., in particular 70-80° C., and the pH is kept constant at 0.5 to 5, in particular about 1.5 to 2.5, by simultaneous metered addition of a base, so that the corresponding hydrate is precipitated directly onto the substrate without secondary precipitations occurring.

The coated substrates are subsequently separated off, washed and dried at 50-150° C., in general for 6-18 h, and calcined at 300-815° C., preferably at 500-800° C., in general for 15 min-2 h.

The proportion of $TiO_2$, based on the substrate, is preferably 0.1-200%, in particular 5-100% and very particularly preferably 10-50%. Depending on the shape and size of the substrate employed, the $TiO_2$ layer preferably has layer thicknesses of 1-500 nm, particularly preferably 1-300 nm.

The pigments according to the invention can optionally also be provided with one or more additional layers for achieving, for example, colouristic effects.

The crucial factor for stabilisation of the bismuth compounds is the calcination process after the coating with $TiO_2$. The calcination temperature is preferably ≥300° C. The final pigment has one or more mixed phases after the calcination process.

Particularly preferred pigments according to the invention comprise one or more compounds selected from the group of the following bismuth compounds:

$Bi_2Ti_4O_{11}$
$Bi_2Ti_2O_7$
$Bi_{1.74}Ti_2O_{6.62}$.

Very particularly preferred pigments comprise the following mixed phases:

BiOCl, $Bi_2Ti_4O_{11}$, $TiO_2$ or
BiOCl, $Bi_2Ti_2O_7$ or
BiOCl, $Bi_{1.74}Ti_2O_{6.62}$ or
BiOCl, $Bi_2Ti_4O_{11}$.

The pigments according to the invention are in the form of particles and preferably have particle sizes of 0.01-100.5 μm, preferably 0.02-50 μm and in particular 0.01-10 μm.

The pigments according to the invention are in the form of particles and can be employed in all known application media in a mixture with all known effect pigments, conventional absorption pigments and/or functional pigments and, depending on the composition of the mixture, give rise to unusual colour and application effects, for example in the laser inscription of plastic parts.

The pigments according to the invention can be used in paints, for example automotive and industrial paints, both solvent- and also water-based, and powder coatings, in plastics, printing inks, ceramic glazes or cosmetic formulations. They can also be utilised in the form of preparations (pearlets, pastes), for example for use in printing inks or plastics.

Particular preference is given to the use in plastics of the pigments according to the invention having a melting point which is at least as high as that of the plastic used, preferably >220° C.

The present invention therefore also relates to a laser-inscribable composition which comprises a matrix polymer and the pigment according to the invention. The pigment is preferably employed in concentrations of 0.05-5% by weight, in particular 0.1-2% by weight and very particularly preferably 0.2-1% by weight, based on the matrix polymer to be inscribed.

All known matrix polymers, such as, for example, plastics, binders, resins, etc., can be employed for the laser-inscription and laser-welding application. Suitable plastics are, for example, thermoplastics and thermosets, such as, for example, polyethylene (PE), polypropylene (PP), polyamide (PA), polyester, polyether, polyphenylene ether, polyacrylate, polyurethane (PU), polyoxymethylene (POM), polymethacrylate, polymethyl methacrylate (PMMA), polyvinyl acetate (PVAC), polystyrene (PS), acrylonitrile-butadiene-styrene (ABS), acrylonitrile-styrene-acrylate (ASA), ABS graft polymer, polybutylene terephthalate (PBT), polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketone, thermoplastic polyurethane (TPU), thermoplastic elastomers (TPE), epoxy resin (EP), silicone resin (SI), unsaturated polyester resin (UP), phenol-formaldehyde resin (PF), ureaformaldehyde resin (UF), melamine resin (MF) and copolymers thereof and/or mixtures thereof. The polymer may also be a copolymer or block copolymer, etc. The polymer matrix to be marked may furthermore also comprise conventional and suitable additives.

The plastic is inscribed or welded as follows by means of suitable laser radiation.

In the laser-inscription method, the sample is placed in the ray path of a pulsed laser beam, preferably an Nd:YAG laser. The inscription can also be carried out using a $CO_2$ laser, for example using a mask technique. The desired results can also be achieved using other conventional types of laser whose wavelength is within the region of high absorption of the microspheres used. The inscription obtained is determined by the irradiation duration (or number of pulses in the case of a pulsed laser) and by the power emitted by the laser and also by the polymer system used. The power of the laser used depends on the specific application and can readily be determined by a person skilled in the art in a specific case.

In the case of laser inscription, the laser used generally has a wavelength in the range from 157 nm to 10.6 μm, preferably in the range from 532 nm to 10.6 μm. Examples which may be mentioned are a $CO_2$ laser (10.6 μm) and an Nd:YAG laser (1064 nm, 532 nm or 355 nm), as well as a pulsed UV laser. Excimer lasers have the following wavelengths: $F_2$ excimer laser: 157 nm, ArF excimer laser: 193 nm, KrCl excimer laser: 222 nm, KrF excimer laser: 248 nm, XeCl excimer laser: 308 nm, XeF excimer laser: 351 nm, and frequency-multiplied Nd:YAG laser: wavelength of 355 nm (frequency-tripled) or 265 nm (frequency-quadrupled). Particular preference is given to the use of Nd:YAG lasers (1064 or 532 nm) and $CO_2$ lasers. The energy densities of the lasers used are generally within the range from 0.3 $mJ/cm^2$ to 50 $J/cm^2$, preferably from 0.3 $mJ/cm^2$ to 10 $J/cm^2$.

If pulsed lasers are used, the pulse frequency is generally within the range from 1 to 150 kHz. Corresponding lasers which can be used in the process according to the invention are commercially available.

The inscription using the laser is preferably carried out by introducing the article into the ray path of a $CO_2$ laser (10.6 μm) or a pulsed laser, preferably an Nd:YAG or Nd:YVO$_4$ laser.

The pigments according to the invention can be used in any desired area in which conventional printing processes have hitherto been used for the inscription or marking of matrix polymers. Virtually any plastic article can be obtained in laser-markable or laser-inscribable form. Any type of article which consists of a matrix polymer, such as a plastic, can be provided with function data, bar codes, logos, graphics, pictures and identification codes. In addition, they can be used, for example,

- in medical equipment, such as tubes, containers for tissue samples or fluids, syringes, pots, covers, catheters,
- in the automobile sector, for example for fluid containers, cabling, components,
- in the telecommunications and E&E sectors, for example for GSM fronts, keyboards, microswitches,
- in security and identification applications, such as, for example, credit cards, identification cards, animal identification tags, labels, security strips,
- in marketing applications, such as, for example, logos, decoration on corks, golf balls, promotional articles,
- in packaging, such as, for example, single- and multilayered films, bottles, caps and closures, including screw caps for bottles, security closures and synthetic corks.

For example, mouldings made from plastics which comprise the pigment according to the invention can be used in the electrical industry, electronics industry or motor vehicle industry. With the aid of laser light, it is possible to produce identification markings or inscription markings even at points to which access is difficult, for example on cables, lines, decorative strips or functional parts in the heating, ventilation or cooling sector or on switches, plugs, levers or handles. The polymer system according to the invention comprising pigments of the formula I can also be used for packaging in the food and drinks sector or in the toys sector. The inscriptions on the packaging are wipe- and scratch-resistant, resistant during downstream sterilisation processes, and can be employed in a hygienically clean manner during the inscription process. Complete label motifs can be applied in a durable manner to packaging of reusable systems. A further important application sector for laser inscription is the inscription of plastics for the production of individual identification markings for animals, which are known as cattle ear tags or simply ear tags. The information specifically associated with the animal is stored via a bar code system. It can be called up again when required with the aid of a scanner. The inscription must be extremely resistant, since some tags remain on the animals for many years.

Dark inscriptions in the polymer or plastic are achieved in the case of laser marking with the aid of the pigments according to the invention, where the inscription has high contrast together with high edge sharpness.

Laser welding with the pigment according to the invention can be carried out in all areas in which conventional joining methods have been employed and in which it was hitherto not possible to employ the welding process owing to laser-transparent polymers or pale colours. The welding process for laser-transparent plastics thus represents an alternative to conventional joining methods, for example high-frequency welding, vibration welding, ultrasound welding, hot-air welding or also adhesive bonding of plastic parts.

The following examples are intended to explain the invention without restricting it. The percentages relate to the weight, unless indicated otherwise.

EXAMPLES

Example 1 (100% of $TiO_2$ Based on the Substrate; Calcination Temperature 750° C.)

100 g of $Bi_2O_3$ (bismuth oxide, varistor grade fine; average particle size: 2 μm, 5N Plus Lübeck GmbH) are heated to 75° C. in 2 l of demineralised water with stirring.

The pH of the suspension is then adjusted to 2.2 using 25% hydrochloric acid. A 32% titanium tetrachloride solution (400 g of $TiCl_4$ solution; w=60%, dissolved in 350 g of demineralised water) is then metered in, during which the pH is kept constant by simultaneous dropwise addition of 32% sodium hydroxide solution.

When the addition is complete, the mixture is stirred for a further 0.5 h. The product is filtered, washed, dried for 12 h, calcined at 750° C. for 0.5 h, sieved through a 100 μm sieve and investigated with the aid of XRD.

The slightly yellowish material obtained in this way is incorporated into polyamide in a proportion of 0.25% by means of an extruder. This compound is then shaped into test plates on an injection-moulding machine. A test grid, by means of which a large band width of various laser settings with respect to energy of the laser, speed of the laser beam and frequency of the laser pulse can be depicted, is marked onto these plates using an Nd:YAG laser (Trumpf: writing speed: 500-5000 mm/s, pulse frequency: 20-100 kHz). The additive from Example 1 exhibits a uniform black mark of excellent contrast over virtually the entire spectrum of different laser parameters.

Comparative Example 1

Incorporation of $Bi_2O_3$ into Polyamide $Bi_2O_3$ (bismuth oxide, varistor grade fine; average particle size: 2 μm, 5N Plus Lübeck GmbH) is incorporated into polyamide in a proportion of 1% by means of an extruder. Decomposition reactions occur even during processing in the extruder, and a dark to black-discoloured product forms.

The "compound" is then shaped into dark-brown to black test plates on an injection-moulding machine. A test grid is marked onto these plates using an Nd:YAG laser (Trumpf: writing speed: 500-5000 mm/s, pulse frequency: 20-100 kHz). The contrast of the dark inscription on a dark background is virtually invisible to the eye.

Example 2 (12.5% of $TiO_2$, Based on the Substrate; Calcination Temperature 600° C.)

100 g of $Bi_2O_3$ (bismuth oxide, varistor grade fine; average particle size: 2 μm, 5N Plus Lübeck GmbH) are heated to 75° C. in 2 l of demineralised water with stirring.

The pH of the suspension is then adjusted to 2.2 using 25% hydrochloric acid. A 32% titanium tetrachloride solution (50 g of $TiCl_4$ solution; w=60%, dissolved in 44 g of demineralised water) is then metered in, during which the pH is kept constant by simultaneous dropwise addition of 32% sodium hydroxide solution.

When the addition is complete, the mixture is stirred for a further 0.5 h. The product is filtered, washed, dried for 15 h, calcined at 600° C. for 0.5 h, sieved through a 100 μm sieve and investigated with the aid of XRD.

The slightly yellowish material obtained in this way is incorporated into polyamide in a proportion of 0.5% by means of an extruder. This compound is then shaped into test plates on an injection-moulding machine. A test grid, by means of which a large band width of various laser settings with respect to energy of the laser, speed of the laser beam and frequency of the laser pulse can be depicted, is marked onto these plates using an Nd:YAG laser (Trumpf: writing speed: 500-5000 mm/s, pulse frequency: 20-100 kHz). The additive from Example 2 exhibits a uniform black mark of excellent contrast over virtually the entire spectrum of different laser parameters.

Example 3 (6.25% of $TiO_2$, Based on the Substrate; Calcination Temperature 750° C.)

100 g of $Bi_2O_3$ (bismuth oxide, varistor grade fine; average particle size: 2 μm, 5N Plus Lübeck GmbH) are heated to 75° C. in 2 l of demineralised water with stirring.

The pH of the suspension is then adjusted to 2.2 using 25% hydrochloric acid. A 32% titanium tetrachloride solution (25 g of TiCl$_4$ solution; w=60%, dissolved in 22 g of demineralised water) is then metered in, during which the pH is kept constant by simultaneous dropwise addition of 32% sodium hydroxide solution.

When the addition is complete, the mixture is stirred for a further 0.5 h. The product is filtered, washed, dried for 12 h, calcined at 750° C. for 2 h, sieved through a 100 μm sieve and investigated with the aid of XRD.

The slightly yellowish material obtained in this way is incorporated into polyamide in a proportion of 1.0% by means of an extruder. This compound is then shaped into test plates on an injection-moulding machine. A test grid, by means of which a large band width of various laser settings with respect to energy of the laser, speed of the laser beam and frequency of the laser pulse can be depicted, is marked onto these plates using an Nd:YAG laser (Trumpf: writing speed: 500-5000 mm/s, pulse frequency: 20-100 kHz). The additive from Example 3 exhibits a uniform black mark of excellent contrast over virtually the entire spectrum of different laser parameters.

Example 4 (6.25% of TiO$_2$, Based on the Substrate; Calcination Temperature 600° C.)

100 g of Bi$_2$O$_3$ (bismuth oxide, varistor grade fine; average particle size: 2 μm, 5N Plus Lübeck GmbH) are heated to 75° C. in 2 l of demineralised water with stirring.

The pH of the suspension is then adjusted to 2.2 using 25% hydrochloric acid.

A 32% titanium tetrachloride solution (25 g of TiCl$_4$ solution; w=60%, dissolved in 22 g of demineralised water) is then metered in, during which the pH is kept constant by simultaneous dropwise addition of 32% sodium hydroxide solution.

When the addition is complete, the mixture is stirred for a further 0.5 h. The product is filtered, washed, dried for 12 h, calcined at 600° C. for 1 h, sieved through a 100 μm sieve and investigated with the aid of XRD.

The slightly yellowish material obtained in this way is incorporated into polyamide in a proportion of 1.0% by means of an extruder. This compound is then shaped into test plates on an injection-moulding machine. A test grid, by means of which a large band width of various laser settings with respect to energy of the laser, speed of the laser beam and frequency of the laser pulse can be depicted, is marked onto these plates using an Nd:YVO$_4$ laser (Trumpf: writing speed: 4000-10000 mm/s, pulse frequency: 20-60 kHz). The additive from Example 4 exhibits a uniform black mark of excellent contrast over virtually the entire spectrum of different laser parameters.

Example 5 (50% of TiO$_2$, Based on the Substrate; Calcination Temperature 750° C.)

100 g of Bi$_2$O$_3$ (bismuth oxide, varistor grade fine; average particle size: 2 μm, 5N Plus Lübeck GmbH) are heated to 75° C. in 2 l of demineralised water with stirring.

The pH of the suspension is then adjusted to 2.2 using 25% hydrochloric acid. A 32% titanium tetrachloride solution (200 g of TiCl$_4$ solution; w=60%, dissolved in 175 g of demineralised water) is then metered in, during which the pH is kept constant by simultaneous dropwise addition of 32% sodium hydroxide solution.

When the addition is complete, the mixture is stirred for a further 0.5 h. The product is filtered, washed, dried for 12 h, calcined at 750° C. for 1 h, sieved through a 100 μm sieve and investigated with the aid of XRD.

The slightly yellowish material obtained in this way is incorporated into polyamide in a proportion of 0.25% by means of an extruder. This compound is then shaped into test plates on an injection-moulding machine. A test grid, by means of which a large band width of various laser settings with respect to energy of the laser, speed of the laser beam and frequency of the laser pulse can be depicted, is marked onto these plates using an Nd:YVO$_4$ laser (Trumpf: writing speed: 4000-10000 mm/s, pulse frequency: 20-60 kHz). The additive from Example 5 exhibits a uniform black mark of excellent contrast over virtually the entire spectrum of different laser parameters.

Example 6 (12.5% of TiO$_2$, Based on the Substrate; Calcination Temperature 750° C.)

100 g of Bi$_2$O$_3$ (bismuth oxide, varistor grade; average particle size: 4 μm, 5N Plus Lübeck GmbH) are heated to 75° C. in 2 l of demineralised water with stirring.

The pH of the suspension is then adjusted to 2.2 using 25% hydrochloric acid. A 32% titanium tetrachloride solution (50 g of TiCl$_4$ solution; w=60%, dissolved in 44 g of demineralised water) is then metered in, during which the pH is kept constant by simultaneous dropwise addition of 32% sodium hydroxide solution.

When the addition is complete, the mixture is stirred for a further 0.5 h. The product is filtered, washed, dried for 12 h, calcined at 750° C. for 0.5 h, sieved through a 100 μm sieve and investigated with the aid of XRD.

Example 7 (25.0% of TiO$_2$, Based on the Substrate; Calcination Temperature 750° C.)

100 g of Bi$_2$O$_3$ (bismuth oxide, varistor grade; average particle size: 4 μm, 5N Plus Lübeck GmbH) are heated to 75° C. in 2 l of demineralised water with stirring.

The pH of the suspension is then adjusted to 2.2 using 25% hydrochloric acid. A 32% titanium tetrachloride solution (100 g of TiCl$_4$ solution; w=60%, dissolved in 88 g of demineralised water) is then metered in, during which the pH is kept constant by simultaneous dropwise addition of 32% sodium hydroxide solution.

When the addition is complete, the mixture is stirred for a further 0.5 h. The product is filtered, washed, dried for 15 h, calcined at 750° C. for 1 h, sieved through a 100 μm sieve and investigated with the aid of XRD.

The following phases are found according to XRD in the products of Examples 1 to 7:

TABLE

| Example | Calcination temperature (° C.) | TiO$_2$ (% based on Bi$_2$O$_3$) | Bi$_2$O$_3$:TiO$_2$ | Finding |
|---|---|---|---|---|
| 1 | 750 | 100 | 50:50 | BiOCl, Bi$_2$Ti$_4$O$_{11}$, TiO$_2$ |
| 2 | 600 | 12.5 | 90:10 | BiOCl, Bi$_2$Ti$_2$O$_7$ |
| 3 | 750 | 6.25 | 94.6:6 | BiOCl, Bi$_{1.74}$Ti$_2$O$_{6.62}$ |
| 4 | 600 | 6.25 | 94.6:6 | BiOCl, Bi$_2$Ti$_2$O$_7$ |
| 5 | 750 | 50 | 67:33 | BiOCl, Bi$_2$Ti$_4$O$_{11}$ |

TABLE-continued

| Example | Calcination temperature (° C.) | TiO$_2$ (% based on Bi$_2$O$_3$) | Bi$_2$O$_3$:TiO$_2$ | Finding |
|---|---|---|---|---|
| 6 | 750 | 12.5 | 90:10 | BiOCl, Bi$_2$Ti$_4$O$_{11}$ |
| 7 | 750 | 25 | 80:20 | BiOCl, Bi$_2$Ti$_4$O$_{11}$ |

The invention claimed is:

1. Pigment of the formula I, $$m\text{Bi}_2\text{O}_3 * n\text{BiOX} * o\text{Bi}_a\text{Ti}_b\text{O}_c * p\text{Ti}_x\text{O}_y \qquad \text{I}$$

where
X denotes halogen,
a denotes 1-15,
b denotes 1-5,
c denotes 1-15,
m denotes 0-5,
n denotes 1-5,
o denotes 1-5,
p denotes 0-5,
x denotes 1-8,
y denotes 1-10.

2. Pigment according to claim 1, characterised in that X denotes chlorine.

3. Pigment according to claim 1, characterised in that n=1.

4. Pigment according to claim 1, characterised in that a=1-3.

5. Pigment according to claim 1, characterised in that b=2-5.

6. Pigment according to claim 1, characterised in that c=5-20.

7. Pigment according to claim 1, characterised in that it comprises one or more compounds from the group of the compounds Bi$_2$Ti$_4$O$_{11}$
Bi$_2$Ti$_2$O$_7$
Bi$_{1.74}$Ti$_2$O$_{6.62}$.

8. Pigment according to claim 1, characterised in that the pigment comprises the following mixed phases:
BiOCl, Bi$_2$Ti$_4$O$_{11}$, TiO$_2$ or
BiOCl, Bi$_2$Ti$_2$O$_7$ or
BiOCl, Bi$_{1.74}$Ti$_2$O$_{6.62}$ or
BiOCl, Bi$_2$Ti$_4$O$_{11}$.

9. Pigment according to claim 1, characterised in that the pigment has particle sizes of 0.01-100.5 μm.

10. Process for the preparation of the pigment according to claim 1, characterised in that a bismuth compound selected from the group Bi$_2$O$_3$, BiOCl, BiONO$_3$, Bi(NO$_3$)$_3$, Bi$_2$O$_2$CO$_3$, BiOOH, BiOF, BiOBr, BiOC$_3$H$_5$O$_7$, Bi(C$_7$H$_5$O$_2$)$_3$, BiPO$_4$, Bi$_2$(SO$_4$)$_3$, Bi$_a$M$_b$O$_c$ where M=Zn, Ti, Fe, Cu, Al, Zr, P, Sn, Sr, Si, Y, Nb, La, Ta, Pr, Ca, Mg, Mo, W, Sb, Cr, Ba, Ce and a=0.3-70, b=0.05-8 and c=1-100 is coated with TiO$_2$ and subsequently calcined at temperatures of 300-815° C.

11. Process according to claim 10, characterised in that the bismuth compound is Bi$_2$O$_3$.

12. A composition comprising a pigment according to claim 1 as additive for laser marking, for laser welding, in paints, coatings, powder coatings, printing inks, plastics, or granules.

13. Polymer matrix comprising at least one pigment according to claim 1 and a polymer.

* * * * *